United States Patent
Pirooz et al.

(10) Patent No.: US 7,542,516 B2
(45) Date of Patent: Jun. 2, 2009

(54) SYNCHRONIZATION METHOD FOR SYMBOL BOUNDARY DETECTION IN UWB-OFDM

(75) Inventors: Ali D. Pirooz, Fremont, CA (US); Catherine A. French, Olympia, WA (US); Jayesh Desai, Milpitas, CA (US); Hung C. Nguyen, Milpitas, CA (US)

(73) Assignee: Sigma Designs, Inc., Milpitas, CA (US)

( * ) Notice: Subject to any disclaimer, the term of this patent is extended or adjusted under 35 U.S.C. 154(b) by 614 days.

(21) Appl. No.: 11/288,879

(22) Filed: Nov. 28, 2005

(65) Prior Publication Data

US 2006/0203925 A1    Sep. 14, 2006

Related U.S. Application Data

(60) Provisional application No. 60/661,121, filed on Mar. 10, 2005.

(51) Int. Cl.
    *H04K 1/10* (2006.01)
(52) U.S. Cl. .............. 375/260; 375/150; 375/259; 370/315; 370/316; 370/293; 370/69.1; 370/501; 342/150; 342/151; 342/152; 342/193; 327/1; 327/100; 455/59
(58) Field of Classification Search ............... 375/150, 375/260, 259; 370/315, 316, 279, 293, 492, 370/501, 69.1; 342/150.151, 152, 193; 327/1, 327/100; 455/59
See application file for complete search history.

(56) References Cited

U.S. PATENT DOCUMENTS

| | | | | |
|---|---|---|---|---|
| 4,379,284 A | * | 4/1983 | Boykin .................... | 375/329 |
| 6,487,252 B1 | * | 11/2002 | Kleider et al. ............ | 375/260 |
| 2003/0099314 A1 | * | 5/2003 | Gummadi et al. ......... | 375/343 |
| 2004/0057468 A1 | * | 3/2004 | Shieh et al. ............... | 370/514 |
| 2004/0208261 A1 | * | 10/2004 | Chen ........................ | 375/319 |

OTHER PUBLICATIONS

John Terry et al., "Synchronization," OFDM Wireless LANs: A Theoretical and Practical Guide, 2002, pp. 57-60, ISBN 0-672-32157-2, Sams Publishing, United States of America.
Anuj Batra, "Project, IEEE P802.15 Working Group for Wireless Personal Area Networks (WPANs)," IEEE 802.15-03/267r1, Jul. 2003, slides 1-53, 802.15-03/267r1, IEEE, U.S.A.

* cited by examiner

*Primary Examiner*—Shuwang Liu
*Assistant Examiner*—Helene Tayong
(74) *Attorney, Agent, or Firm*—Nixon Peabody LLP; Aaron Wininger (57) ABSTRACT

A method is presented for packet detection and symbol boundary location using a two-step sign correlation procedure. When the correlation crosses a threshold, a packet detection signal is generated to initiate processing of downstream blocks, and a symbol boundary location signal is generated for use in aligning data during processing.

19 Claims, 6 Drawing Sheets

SYNCHRONIZATION METHOD FOR SYMBOL BOUNDARY DETECTION IN UWB-OFDM

PRIORITY REFERENCE TO PRIOR APPLICATIONS

This application claims benefit of and incorporates by reference patent application Ser. No. 60/661,121, entitled "A NOVEL SYNCHRONIZATION METHOD FOR SYMBOL BOUNDARY DETECTION IN UWB-MBOA," filed on Mar. 10, 2005, by inventors Ali D. Pirooz et al.

TECHNICAL FIELD

This invention relates generally to Ultra Wideband, and more particularly, but not exclusively, provides a method for symbol boundary detection in Ultra Wideband Orthogonal Frequency Division Multiplexing (UWB-OFDM).

BACKGROUND

UWB-OFDM is a wireless communication technique using low power and a very wide bandwidth, proposed for use in various standards such as IEEE 802.15.3a Personal Area Networks. UWB-OFDM enables high data transfer rates over short distances, up to 800 Mb/sec, thereby removing the need to have cables between consumer electronic products in a home.

UWB-OFDM requires at its front end an accurate and cost effective method of packet detection and symbol boundary location to ensure proper synchronization for the downstream signal processing blocks, such as the Fast Fourier Transform (FFT), channel equalizer, and so on.

SUMMARY

Embodiments of the invention provide a system and method of packet detection and symbol boundary location in UWB-OFDM. In an embodiment of the invention, the method comprises: determining the sign of the input samples; correlating the sign of the input samples with the sign of a reference pattern; comparing the correlation with a threshold to create another set of signed values; correlating these signed values with a second reference pattern; finding a position in the second correlation where the correlation is greater than a threshold; detecting a packet based on the occurrence of a correlation value that exceeds the threshold; setting a symbol boundary based on the occurrence of a correlation value that exceeds the threshold; using the packet detection indication to initiate processing of user data; and using the symbol boundary in downstream blocks to align data during processing.

In an embodiment of the invention, the system comprises: a sign determiner; a first correlation block; a comparator; a second correlation block; and a threshold crossing determiner. The sign determiner determines the sign of input. The first correlation block, which is coupled to the sign determiner, correlates the sign of the input with the sign of a first reference pattern. The comparator, which is coupled to the first correlation block, compares the correlated values with a first threshold to create an intermediate correlation stream. The second correlation block, which is coupled to the comparator, correlates the intermediate correlation stream with a second reference pattern to form an overall correlation. The threshold crossing determiner, which is coupled to the second correlation block, finds a position where the overall correlation crosses a second threshold.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
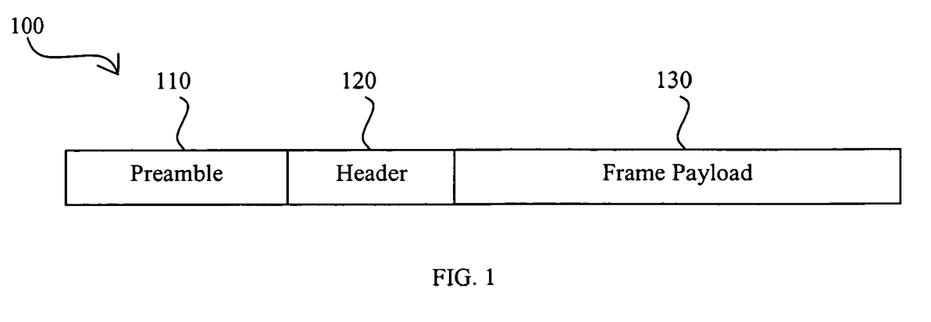
FIG. 1 is a diagram illustrating a packet.

FIG. 1 is a diagram illustrating a packet 100. This is the type of packet defined in the Multiband OFDM Alliance (MBOA) proposal for the standard, IEEE 802.15.3a Personal Area Networks. The packet 100 includes a preamble 110, a header 120, and a frame payload 130. The preamble 110, which is the focus of this invention, is included on transmission to aid the UWB receiver in timing synchronization. The header 120 contains information about parameters used in transmission, and the frame payload 130 contains the actual user information.

In the MBOA standard, which will be used to illustrate embodiments of the invention, the preamble 110 is comprised of several repetitions of a pattern of length 128 samples, with 37 zero samples inserted between repetitions. Each repetition with zeros contains 165 samples and this group of 165 samples is called a symbol. The standard specifies 24 preamble symbols for use in synchronization and related processing. There are 7 different patterns defined in the MBOA standard, with each pattern consisting of a different set of 128 decimal samples. Additionally each pattern is used with a different frequency hopping pattern.

Figure 2:
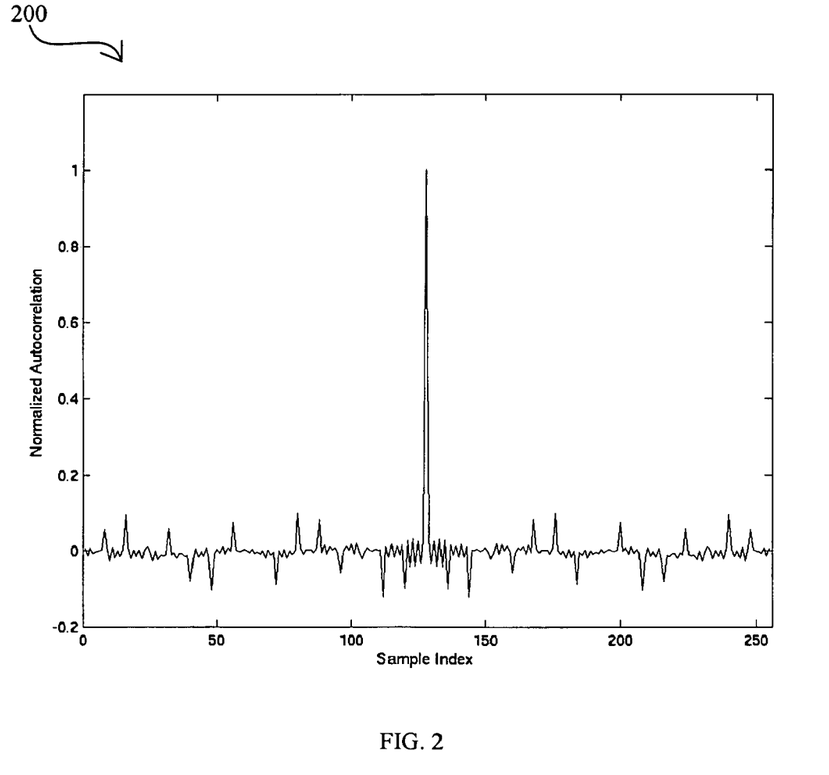
FIG. 2 is a chart illustrating pattern autocorrelation.

FIG. 2 is a chart 200 illustrating pattern autocorrelation for one of the patterns in the standard. The patterns are designed to have a single, sharp autocorrelation peak as shown. Pairs of patterns, on the other hand, do not have a pronounced correlation peak. Therefore it was determined that the best approach to detect the symbol boundary is to correlate the 128 input data with the 128 known (reference) preamble sequence. If the two match, one sees a high peak in correlation as is shown in FIG. 2. The correlation with other patterns generates a weak signal much below the peak in FIG. 2. However, there are some problems with this method. It requires a large number of gates to handle 128 multiplications and 127 additions of multi-bit samples on both the in-phase (I) and quadrature (Q) channels. In addition, all these calculations need to be done quickly (within about 2 ns for the MBOA standard), which would be difficult to implement. Also, increasing power caused by a large number of calculations in a short time has a negative impact on UWB design, which is supposed to be low power.

In prior art, complexity is decreased by using a sign correlation instead of a full correlation in the synchronizer. Specifically, a sign correlation extracts the sign of the incoming samples and correlates it with the sign of the reference pattern. This greatly simplifies the multiplications and additions required, but does not decrease their numbers.

Figure 3:
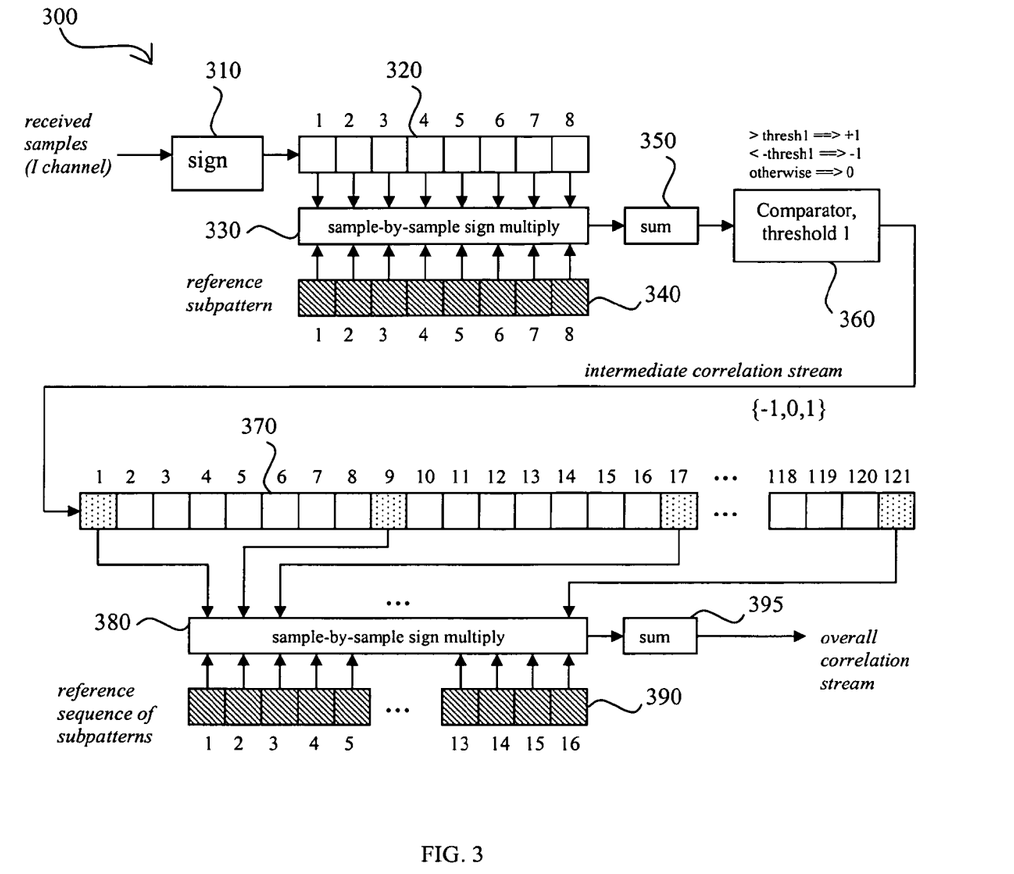
FIG. 3 is a digital circuit diagram illustrating a two-step correlation procedure according to an embodiment of the invention.

In the present invention, complexity is reduced further and significantly using a two-step correlation process that reduces the number of sign multiplies and additions. This embodiment is based on the fact that all 7 preamble patterns in the MBOA standard, when viewed in terms of sign only, are approximately comprised of distinct subpatterns of length 8, repeated 16 times. Each of the 16 repetitions is either a positive or negative version of the subpattern. The sequence of 16 is referred to as the "sequence of subpatterns". The subpatterns and sequences of subpatterns are shown below for all preamble patterns in the MBOA standard.

shift register is connected to a bank of sign multipliers (330) for multiplication by the corresponding signs of the reference subpattern stored internally (340). The multiplier outputs are summed (350), and the output is converted to a correlation stream containing values $\{-1, 0, +1\}$ by comparing to a first threshold. If the values into the comparator (360) are greater than the threshold, the output is set to +1; if less than the negative of the threshold, the output is set to −1; otherwise, the output is set to 0. The intermediate correlation stream out of the comparator (360) enters a second shift register (370) with taps at intervals of 8 cells. Each cell in this register (370) contains 2 bits to store the sign values. The sixteen taps feed into a bank of sign multipliers (380) that perform a sample-by-sample multiply of the values in the register (370) with the values of the stored reference sequences of subpatterns (390). The multiplier outputs are summed (395) to create an overall correlation stream.

Figure 4:
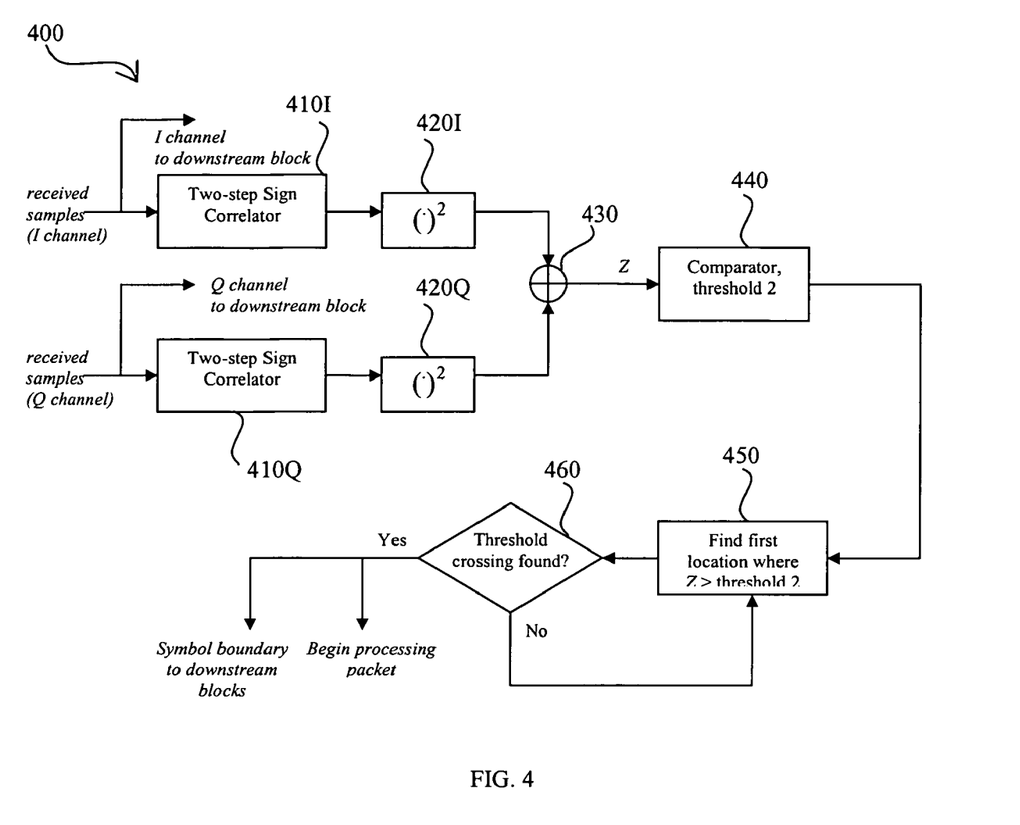
FIG. 4 is a block diagram illustrating the use of a two-step correlation procedure for packet detection and symbol boundary location.

FIG. 4 is a block diagram illustrating the use of the two-step correlation procedure for packet detection and symbol boundary location (400). In phase (I) and quadrature (Q) antennas, analog circuitry, and analog to digital converters produce digital received samples. The samples are processed using a two-step sign correlation block (410I, 410Q), equivalent to FIG. 3 (300). The samples also go to the downstream blocks for signal processing. The correlation stream enters a squaring device (420I, 420Q) in the preferred embodiment. In another embodiment, the squaring device can be replaced by an absolute value function, with the tradeoff of a small reduc-

TABLE

Subpatterns and Sequences of Subpatterns for MBOA

| Pattern Number | Subpattern | Sequence of Subpatterns |
|---|---|---|
| 1 | 1 −1 −1 −1  1  1 −1  1 | 1  1  1 −1 −1  1  1 −1 −1  1 −1  1 −1 −1  1 |
| 2 | 1 −1  1  1 −1 −1 −1  1 | 1 −1 −1 −1 −1 −1  1 −1  1 −1 −1  1  1 −1 −1  1 |
| 3 | 1  1 −1  1  1 −1 −1  1 | 1 −1 −1 −1  1 −1 −1 −1  1 −1 −1  1 −1  1  1 |
| 4 | 1  1  1 −1 −1  1 −1 −1 | 1 −1 −1  1 −1  1 −1 −1  1  1 −1 −1 −1  1 −1  1 |
| 5 | 1  1  1 −1 −1 −1  1 −1 | 1  1  1 −1  1  1  1 −1  1 −1  1  1 −1  1 −1 −1 |
| 6 | −1  1 −1 −1 −1  1  1  1 | 1  1 −1  1 −1  1 −1  1  1 −1  1  1  1  1 −1 −1 |
| 7 | 1  1  1 −1 −1 −1  1 −1 | 1  1 −1 −1 −1 −1  1 −1 −1  1 −1  1 −1  1 −1 −1 |

Table: Subpatterns and Sequences of Subpatterns for MBOA

Therefore, in the embodiment of the invention, overall gate count, power and required timing have been decreased significantly. This new approach requires about one quarter the amount of hardware as the prior art sign correlation.

FIG. 3 is a digital circuit diagram illustrating a two-step correlation procedure 300 according to an embodiment of the invention. In order to reduce the gate count and power and meet the time limitation to perform synchronization, embodiments of the invention use sign multiplication instead of decimal multiplication and divide the correlation into two steps.

Input is received from an antenna, processed by analog circuitry, and converted with an analog to digital converter to digital received samples. The sign of the data is taken (310) by converting samples greater than 0 to +1, less than 0 to −1, and equal to 0 to 0 by a sign determiner. Thus 2 bits are required to represent the output in the preferred embodiment of the sign block. In another embodiment, the sign of 0 can be treated as +1 in order to save logic, with a tradeoff of slightly lower performance. The sign data then enters a shift register (320) of length 8, with 2 bits per shift register cell. Data in the tion in complexity and performance. The squared outputs from the I and Q channels enter an adder (430), and the output is fed to a comparator (440) that compares the combined I/Q correlation stream with a second threshold. A threshold crossing determiner determines if a sample in the correlation exceeds the threshold (450, 460), and if so, a packet detect signal is sent to downstream blocks to initiate processing and decoding of the packet. In addition, the location (timing) of a sample that exceeds the threshold is used to indicate a symbol boundary. This symbol boundary position is passed to downstream blocks to properly align data for processing and decoding.

In the hardware implementation, a counter can be used to generate the symbol boundary signal. The counter is initialized to 0 when the first threshold crossing occurs (450), it counts up one for each sample, and it rolls over after reaching 164 (because the symbol length is 165 samples). Each time the counter rolls over to 0, the symbol boundary signal goes active for one clock.

Figure 5:
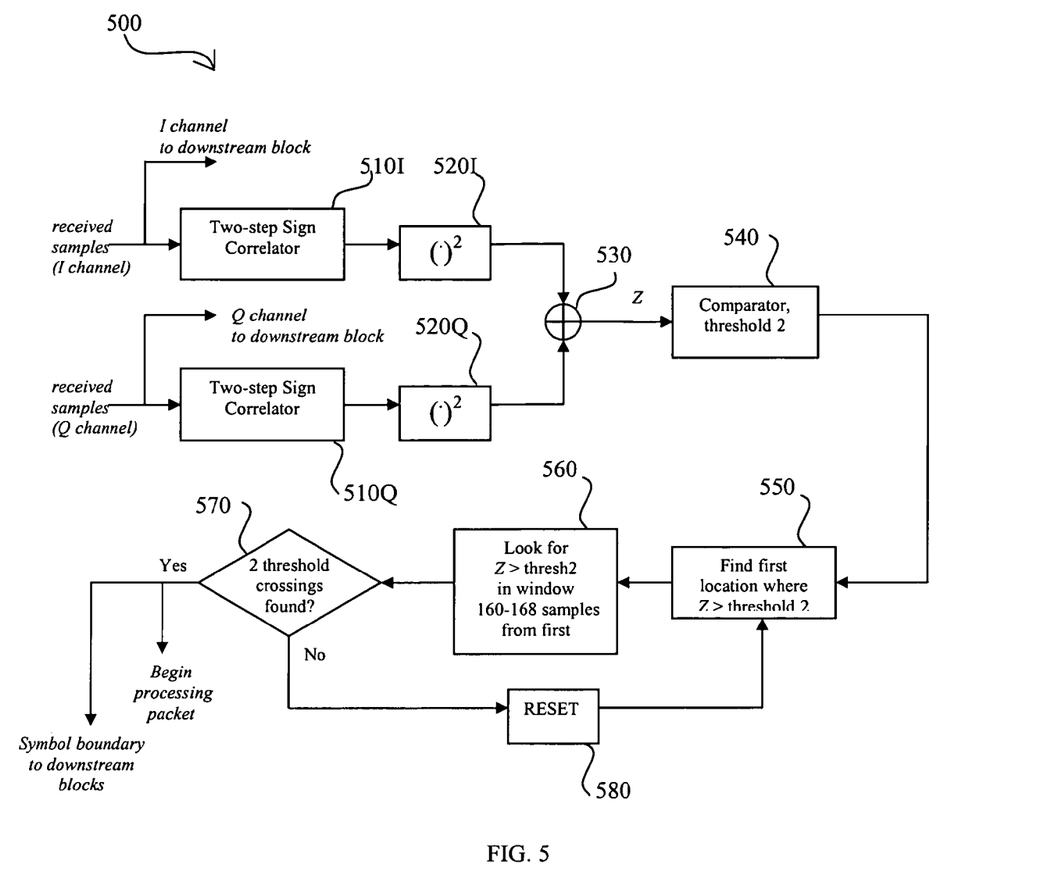
FIG. 5 is a block diagram illustrating the use of a two-step correlation procedure for packet detection and symbol boundary location using two symbols.

FIG. 5 is a block diagram illustrating the use of a two-step correlation procedure for packet detection and symbol boundary location using two symbols (500). In order to improve robustness of the packet detect and symbol boundary device, additional circuitry can be added to limit false detection due to noise or other perturbations. FIG. 5 is the same as FIG. 4 up to and including the comparison to the second threshold (440, 540). For this embodiment, two threshold crossings are required before a packet detect signal and symbol boundary location signal are sent downstream (550, 560, 570). The circuit checks for two threshold crossings (560) separated by approximately one symbol, give or take a few samples (e.g., 4). This increases the probability that the threshold crossings are caused by a packet and not noise. This, in turn, enables the use of a lower value of the second threshold, which is more effective at catching packets affected by a multipath channel, which is common in this application. If two threshold crossings are found, the packet is processed and a symbol boundary signal is generated as described previously. Otherwise, the block is reset (580) and the search for threshold crossings begins again.

When searching for a second threshold crossing, a counter is used to determine whether the second threshold crossing is the proper distance (165 samples, give or take a few samples) from the first. To save circuitry, the counter could potentially be the same counter used to generate the symbol boundary signal.

Figure 6:
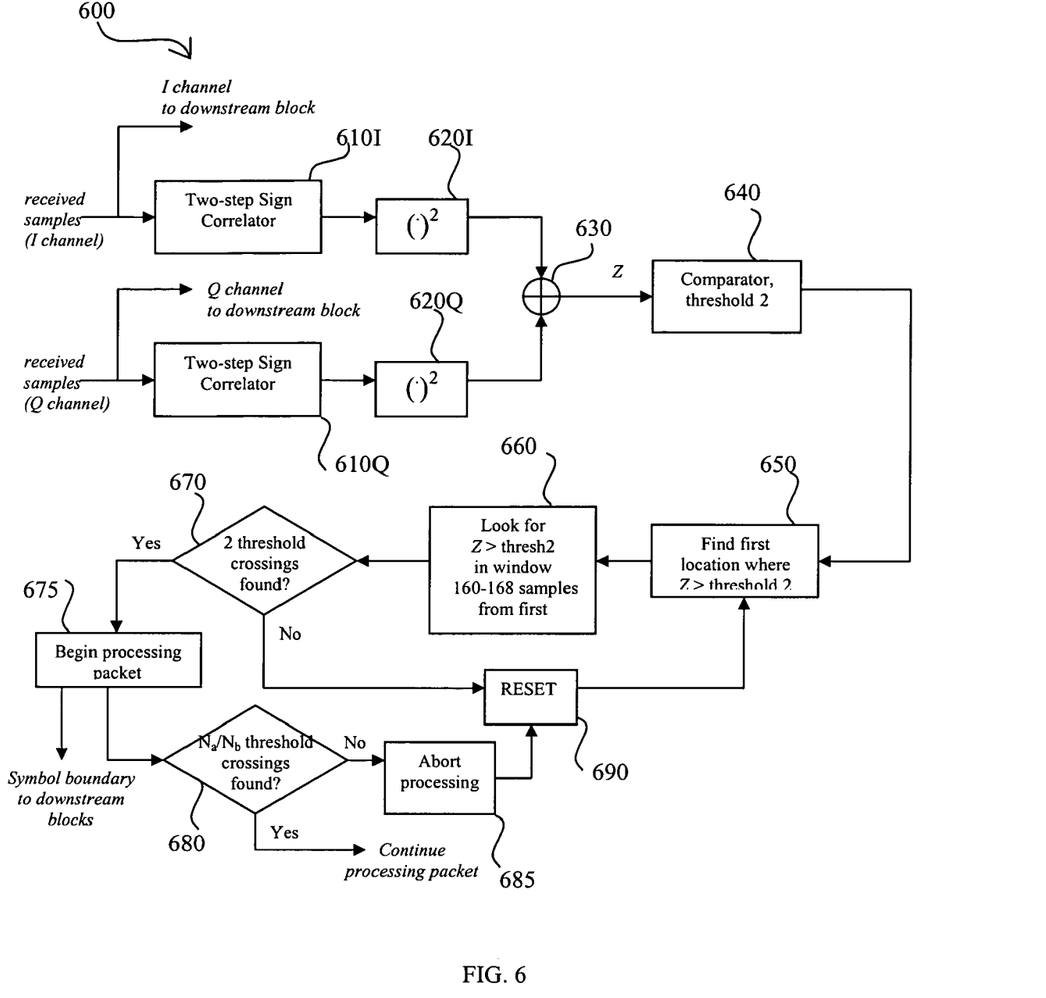
FIG. 6 is a block diagram illustrating the use of a two-step correlation procedure for packet detection and symbol boundary location using a variable number of symbols.

FIG. 6 is a block diagram illustrating the use of a two-step correlation procedure for packet detection and symbol boundary location using a variable number of symbols (600). This provides increased robustness to false detection due to noise. In addition to the circuitry in FIG. 5 that tests for two threshold crossings (650, 660, 670), FIG. 6 includes additional circuitry (680) to check for Na threshold crossings out of $N_b$ preamble symbols immediately following the first two threshold crossings. Again, each of the additional threshold crossings should be separated by approximately 165 samples, as determined using a counter. If two threshold crossings are found, followed by $N_a$ out of $N_b$ crossings, the packet is processed. Otherwise, the packet is aborted (685), the block is reset (690), and the search for threshold crossings begins again. The values of $N_a$ and $N_b$ can be made either fixed or variable within the circuitry. For example, in one embodiment, $N_a$ is made variable between 0 and 2 via a programmable register, and $N_b$ is fixed at 2. This provides some flexibility in testing, gives improved robustness, and results in only a modest increase in circuitry over the embodiment of FIG. 5.

For those cases for which frequency hopping is used, the hopping will occur as needed during the search for threshold crossings for the embodiments of FIG. 5 and FIG. 6. The frequency hopping timing is determined by the symbol boundary signal. When no threshold crossings have occurred or when the search for threshold crossings is initiated, the system will not frequency hop but will remain in the initial frequency band for that particular pattern number.

Figure 7:
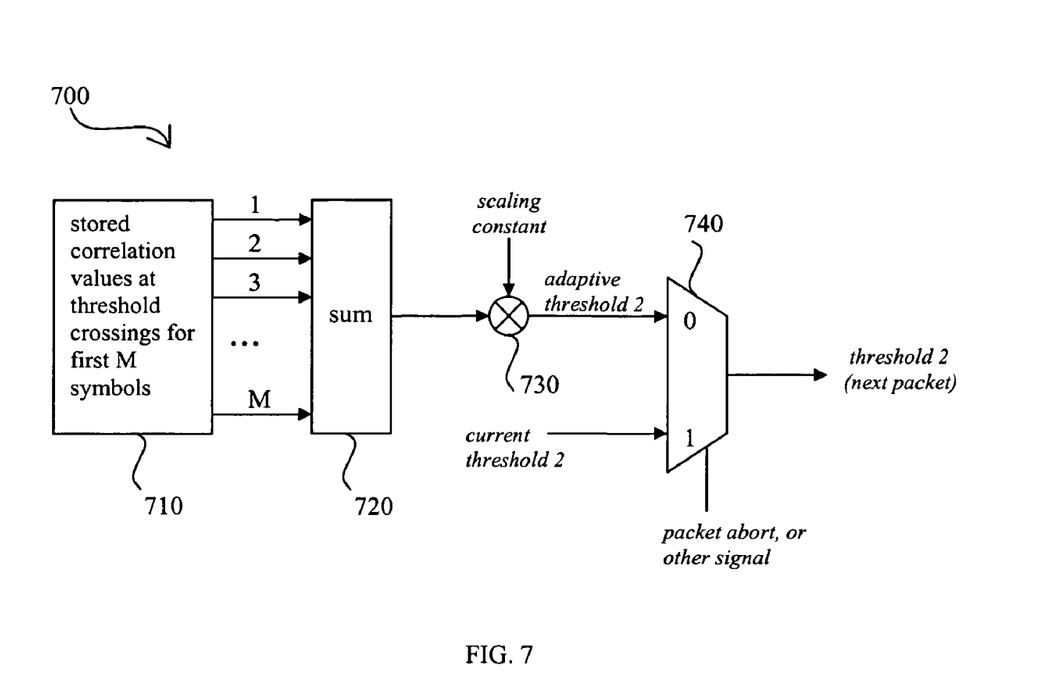
FIG. 7 is a block diagram illustrating a method of adapting a threshold used in packet detection and symbol boundary location.

FIG. 7 is a block diagram illustrating a method of adapting a threshold used in packet detection and symbol boundary location (700). The synchronization method must operate over a wide range of channel conditions, and adapting the second threshold used in the comparators in FIG. 4, 5, or 6 (440, 540, 640) can help to improve performance. The correlation values that exceeded the second threshold for the first M symbols are stored (710). These values are summed (720) and scaled (730) to create a new second threshold for use in the next packet. The circuit can select between the updated second threshold, and the old threshold using a multiplexer (740), whose output is controlled with a signal indicating that the packet was aborted, or with another signal. In one embodiment of the invention, M is set to 2 to simplify the control logic, and the scaling constant is set to ¼. This scaling can be accomplished by simply shifting two bits to the right, thereby eliminating the multiplier (730).

The foregoing description of the illustrated embodiments of the present invention is by way of example only, and other variations and modifications of the above-described embodiments and methods are possible in light of the foregoing teaching. Further, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method for symbol boundary detection in UWB-OFDM, comprising:
   determining a sign of a preamble input comprising multi-level samples;
   correlating the sign of the preamble input with the sign of a first reference pattern to produce correlated values;
   comparing the correlated values with a first threshold to create an intermediate correlation stream;
   correlating the intermediate correlation stream with a second reference pattern to form an overall correlation;
   finding a position where the overall correlation crosses a second threshold; and
   finding a second position where the overall correlation crosses the second threshold within approximately 1 symbol from the first threshold crossing.

2. The method of claim 1, wherein the input comprises in phase (I) and quadrature (Q) channels.

3. The method of claim 1, wherein the second threshold is adapted based on summing and scaling the correlation values from a previous packet.

4. The method. of claim 1, wherein the first reference pattern includes an 8-value subpattern.

5. The method of claim 1, wherein the second reference pattern includes a 16-value pattern of subpatterns.

6. The method of claim 1, further comprising finding a variable number of threshold crossings in the overall correlation separated from the first threshold crossing by approximately an integer number of symbols.

7. The method of claim 1, further comprising aligning data based on the found position.

8. The method of claim 1, further comprising processing and decoding data.

9. The method of claim 1, further comprising squaring the overall correlation and finding a position where the squared correlation crosses the second threshold.

10. A system for symbol boundary detection in UWB-OFDM, comprising:
   means for determining a sign of a preamble input comprising multi-level samples;
   means for correlating the sign of the preamble input with the sign of a first reference pattern to produce correlated values;
   means for comparing the correlated values with a first threshold to create an intermediate correlation stream;
   means for correlating the intermediate correlation stream with a second reference pattern to form an overall correlation;
   means for finding a position where the overall correlation crosses a second threshold; and
   means for finding a second position where the overall correlation crosses the second threshold within approximately 1 symbol from the first threshold crossing.

11. A system for symbol boundary detection in UWB-OFDM, comprising:
   a sign determiner capable of determining the sign of a preamble input comprising multi-level samples;
   a first correlation block, coupled to the sign determiner, capable of correlating the sign of the preamble input with the sign of a first reference pattern to produce correlated values;
   a comparator, coupled to the first correlation block, capable of comparing the correlated values with a first threshold to create an intermediate correlation stream;
   a second correlation block, coupled to the comparator, capable of correlating the intermediate correlation stream with a second reference pattern to form an overall correlation;
   a threshold crossing determiner, coupled to the second correlation block, capable of finding a position where the overall correlation crosses a second threshold; and
   a second threshold crossing determiner capable of finding a second position where the overall correlation crosses the second threshold within approximately 1 symbol from the first threshold crossing.

12. The system of claim 11, wherein the input comprises in phase (I) and quadrature (Q) channels.

13. The system of claim 11, wherein the second threshold is adapted based on summing and scaling the correlation values from a previous packet.

14. The system of claim 11, wherein the first reference pattern includes an 8-value subpattern.

15. The system of claim 11, wherein the second reference pattern includes a 16-value pattern of subpatterns.

16. The system of claim 11, wherein the second threshold crossing determiner is further capable of finding a variable number of threshold crossings in the overall correlation separated from the first threshold crossing by approximately an integer number of symbols.

17. The system of claim 11, further comprising circuitry capable of aligning data based on the found position.

18. The system of claim 11, further comprising circuitry capable of processing and decoding data.

19. The system of claim 11, further comprising a squaring device, coupled to the second correlation block, capable of squaring the output of the second correlation block; and
   wherein the threshold crossing determiner is coupled to the squaring device and capable of finding a position where the squared correlation crosses the second threshold.

* * * * *